United States Patent Office 3,097,051
Patented July 9, 1963

3,097,051
CELLULOSE ESTER ANHYDRIDES IN
FIBER FORM
Ricardo H. Wade, Metairie, La., assignor to the United States of America as represented by the Secretary of Agriculture
No Drawing. Filed Nov. 18, 1958, Ser. No. 774,783
14 Claims. (Cl. 8—120)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the preparation of organic ester anhydrides of native fiber cellulose which retain the native fiber form. More particularly, this invention relates to a new class of native fiber cellulose derivatives, which retain the native fiber form, and which contain a cyclic carboxylic anhydride linked to the cellulose through an ester linkage.

It is an object of the invention to prepare a useful new class of chemically modified native fiber cellulose derivatives, which retain the native fiber form, and which have an unreacted cyclic carboxylic anhydride group. It is a further object of the invention to provide a reactive group previously unavailable in modified native fiber cellulose which retains the native fiber form. Another object is to provide a novel method of preparing useful, fibrous ion-exchange celluloses of the acid ester type which are insoluble, both as the free acid and as their salts, in the common solvents.

Cellulose esters containing free and reactive carboxyl groups, and salts of such esters, are known in the prior art. A conventional procedure for preparing esters of this type is to allow cellulose to react with dibasic acid anhydrides in the presence of a catalyst such as pyridine. Under these conditions, the anhydride ring is opened allowing one end of the molecule to react with the cellulose to form an ester linkage while the other end remains as a free carboxyl group. Cellulose derivatives of this type are commonly called "dibasic acid half esters." Obviously, in view of their mode of preparation, these derivatives do not contain an unreacted cyclic carboxylic anhydride group. Some investigations have also been reported in the prior art on the preparation of acid esters of cellulose using dicarboxylic and tricarboxylic organic acids. None of these products contain a cyclic carboxylic anhydride group.

A method has been found whereby a new class of native fiber cellulose esters, which retain the native fiber form, and which are insoluble in the common solvents and contain unreacted cyclic carboxylic anhydride groups, can be prepared. This new class of native fiber cellulose esters which retains the native fiber form is called "cellulose ester anhydrides" and can be represented by the following three compounds:

Cellulose cis-anhydride aconitate having the Formula I

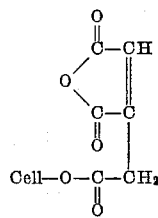

(I)

Cellulose anhydride acetyl citrate having the Formula II

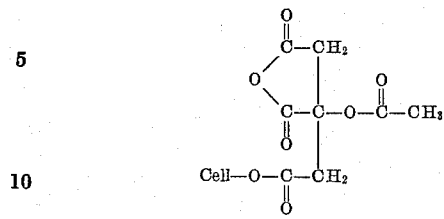

(II)

Cellulose anhydride trimellitate having the Formula III

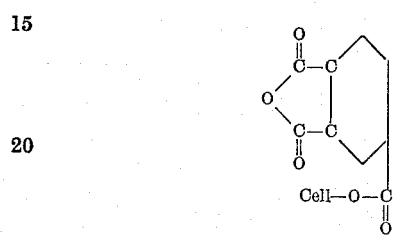

(III)

The cyclic carboxylic anhydride group can be unsaturated as in Compounds I and III, or it can be saturated as in Compound II; it can likewise be substituted as in Compounds II and III, or unsubstituted as in Compound I.

In the process of this invention, a native fiber cellulose, which may be in the form of free fibers, sliver, yarn, thread, or fabric, is reacted in a system comprising trifluoroacetic anhydride (TFAA), a suitable inert non-aqueous solvent or diluent, and the mono-anhydride of a tricarboxylic non-aqueous organic acid which contains one free, active carboxylic acid group in addition to the carboxyl groups involved in the cyclic anhydride structure.

When cellulose is reacted under the preferred conditions, the resulting cellulose ester mono anhydrides retain their original color, appearance, and fibrous form. They are insoluble in common solvents such as water, dilute bases, aqueous acids, ethers, hydrocarbons, alcohols, ketones, and the like. It is preferable to carry out this reaction under essentially anhydrous conditions, although moderate amounts of water can be tolerated. Under the preferred essentially anhydrous conditions, the esterification reaction is more efficient and the cyclic carboxylic anhydride group remains intact and unreacted. If water is present in the reaction system, both the TFAA and the tricarboxylic acid mono-anhydride are decomposed to an extent dependent on the amount of water present, and that portion of the reactants which is decomposed becomes ineffective for the process of this invention.

It is preferred, in the process of the present invention, to employ at least one mole of TFAA for each mole of the tricarboxylic acid mono-anhydride used in the esterification reaction. A slight excess of TFAA is particularly preferred. It is inefficient and uneconomical to use a large excess of TFAA.

The proportion of cellulose employed in the esterification reaction of this invention can be varied considerably, depending on the extent of reaction (degree of substitution) desired on the hydroxyl groups of the anhydroglucose units in the cellulose structure, and the particular properties desired in the final product. It is generally preferred to use about a three-fold excess of cellulose, based on the moles of TFAA and moles of the esterification tricarboxylic acid mono-anhydride employed. That is to say, one mole of anhydroglucose unit (containing three reactive "OH" groups per mole) is preferred for one mole of the esterification tricarboxylic acid mono-anhydride and one or more moles of TFAA. The degree of substitution (D.S.) achieved under these conditions is usually from about 0.1 to about 0.3 of the esterification tricarboxylic acid mono-anhydride groups per anhydroglucose unit. The D.S. can be increased by lowering the effective proportion of cellulose or can be decreased by increasing the effective proportion of cellulose. The maximum D.S. theoretically possible is 3.

The reaction can be carried out in any inert non-aqueous solvent in which the TFAA and the tricarboxylic acid mono-anhydride are appreciably soluble. In the case of cotton, which is insoluble in the ordinary solvents, it is preferred to carry out the reaction with mixing or agitation to assure intimate contact between the insoluble cotton and the other reactants. Suitable solvents include benzene, toluene, and similar aromatics; hydrocarbon solvents such as hexane and heptane; chlorinated solvents such as carbon tetrachloride and chloroform; and the like solvents. Alcohols, ketones, and aldehydes are not usually suitable as solvents.

The temperature of the reaction can be varied depending, for example, upon the particular solvent and reactants employed, the rapidity of reaction wanted, the particular properties desired in the reaction product, and other factors. In general, the reaction can be carried out at a temperature ranging from about 20° C. up to at least about the reflux temperature of the particular reaction mixture being employed. It is preferred to carry out the reaction at about room temperature (about 20° to 30° C.) when the rate of reaction at this temperature is sufficiently great to be practical. For example, it is satisfactory to react cotton cellulose for about 20 to 24 hours at room temperature with cis-aconitic anhydride or acetyl citric anhydride under the preferred conditions of the process of this invention.

The chemically modified cellulose products prepared according to this invention have novel utility as latent cation exchange materials because of the unreacted cyclic carboxylic anhydride structure present in the products which have not been subject to treatment with water or aqueous agents. The two latent carboxylic units are protected by virtue of the mono-anhydride structure, and can be activated just prior to use as cation exchangers by merely treating with water. This treatment opens the mono-anhydride ring and the resulting two carboxylic acid groups are immediately available for use as cation exchangers. These new cellulose ion-exchangers have the advantage over the conventional, well-known granular ion-exchangers in that they do not require the initial lengthy and time-consuming operation of conversion of the exchanger to the acid form with mineral acids, with the subsequent repeated washing with water to remove excess mineral acid, as required for the granular cation exchangers.

Numerous useful products can be prepared by means of conventional chemical reactions utilizing the reactive carboxyl groups of the modified cellulose. Another reactive site is available for chemical modification if the tricarboxylic acid mono-anhydride reactant has a carbon-to-carbon unsaturated linkage, as for example in cis-aconitic anhydride.

The following examples illustrate this invention as regards cellulose ester anhydrides produced by the reaction of cotton yarn of fabric with cis-aconitic anhydride (an unsubstituted tricarboxylic acid mono-anhydride) and acetyl citric anhydride (a substituted tricarboxylic acid mono-anhydride).

EXAMPLE 1

The cellulose fibers used were cotton fibers in the form of 12/3 yarn which had been scoured by the conventional procedures.

Five grams of the scoured cotton yarn was "activated" by immersing it in several heundred ml. of distilled water contained in a beaker, placing the beaker in a vacuum desiccator at room temperature, and evacuating the desiccator continuously with a vacuum pump over a 3-hour period. (Activation treatments of this or similar nature are frequently employed to open the structure of the cotton and assure that the cellulose is sufficiently accessible to the action of subsequent chemical treating agents.) Following the activation treatment, the yarn was squeezed to free it of excess water, and was then solvent-exchanged by immersing in six successive 200 ml. portions of 95% ethyl alcohol, stirring continuously during each successive 15 minute treatment. The solvent exchange process was repeated using 200 ml. portions of dry benzene until two successive benzene washes did not show cloudiness, indicating completeness of the solvent exchange from water to benzene. The yarn was removed from the last benzene solvent exchange treatment, and excess benzene was expressed. The yarn was added to a reaction mixture consisting of 4.8 g. of cis-aconitic anhydrides, 9 ml. (13.5 g.) of TFAA, and 50 ml. of dry benzene contained in a cylindrical, glass-stoppered reaction chamber provided with a pressure clamp. The contents of the closed reaction chamber were then agitated in a tumbling action provided by a rotating wheel to which the reaction chamber was attached. The agitation and reaction were allowed to proceed for 20 hours at room temperature (about 30° C.). The yarn was then removed and washed free of reagents with six 200 ml. portions of 95% ethyl alcohol, allowing 15 minute equilibration for each successive wash. The yarn was given a final washing in running distilled water for 30 minutes. The yarn was allowed to stand in distilled water for an additional 15 minutes, and no pH change was noted in the water during this time, indicating complete removal of the unreacted acidic reactants. The yarn sample was allowed to air dry at room temperature. It was almost indistinguishable from the untreated yarn, on the basis of feel, color, and appearance.

The treated yarn contained 18.0% total aconityl content

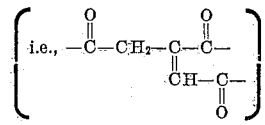

as determined by a conventional method (Eberstadt). This corresponds to 20.3% aconityl anhydride

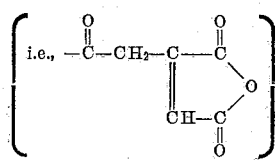

representing a degree of substitution (D.S.) of about 0.30. The maximum cation exchange capacity of the treated yarn was 2,400 milliequivalents per kilogram, as determined in the conventional manner. This value demonstrates the presence of free unreacted carboxyl groups in the treated yarn.

Infrared absorption spectra of the treated yarn, as well as of the untreated (control) yarn and cis-aconitic anhydride, were obtained using conventional procedures employing the KBr disc technique. Infrared data for the treated yarn and pure cis-aconitic anhydride are given in Table I.

*Table 1.—Infrared Spectral Data for Cellulose Ester Anhydrides and Cellulose Acid Esters*

| Sample No. | Description | Position of band, microns | Group responsible for band |
|---|---|---|---|
| 1, Example 1 | Cellulose acid ester of cis-aconitic anhydride | 5.80 M | Carboxyl ($-\overset{O}{\overset{\|}{C}}-OH$) |
| | | 5.72 I | Carboxylic ester ($-\overset{O}{\overset{\|}{C}}-OR$) |
| 1, Example 2 | Cellulose ester anhydride of cis-aconitic anhydride. | 5.56 M | Anhydride ($-\overset{O}{\overset{\|}{C}}-O-\overset{O}{\overset{\|}{C}}-$) |
| | | 5.41 M | Anhydride ($-\overset{O}{\overset{\|}{C}}-O-\overset{O}{\overset{\|}{C}}-$) |
| 2, Example 2 | Cellulose acid ester of cis-aconitic anhydride | 5.80 M | Unresolved carboxyl and carboxylic ester. |
| 1, Example 3 | Cellulose ester anhydride of cis-aconitic anhydride. | 5.56 M | Anhydride ($-\overset{O}{\overset{\|}{C}}-O-\overset{O}{\overset{\|}{C}}-$) |
| | | 5.41 M | Anhydride ($-\overset{O}{\overset{\|}{C}}-O-\overset{O}{\overset{\|}{C}}-$) |
| | | 5.72 S | Carboxylic ester ($-\overset{O}{\overset{\|}{C}}-OR$) |
| 2, Example 3 | Cellulose acid ester of cis-aconitic anhydride | 5.86 M | Unresolved carboxyl and carboxylic ester. |
| 1, Example 4 | Cellulose ester anhydride of acetyl citric anhydride. | 5.51 M | Anhydride ($-\overset{O}{\overset{\|}{C}}-O-\overset{O}{\overset{\|}{C}}-$) |
| | | 5.70 I | Carboxylic ester ($-\overset{O}{\overset{\|}{C}}-OR$) |
| 2, Example 4 | Cellulose acid ester of acetyl citric anhydride | 5.76 M | Unresolved carboxyl and carboxylic ester. |
| | Pure cis-aconitic anhydride | 5.60 M | Anhydride ($-\overset{O}{\overset{\|}{C}}-O-\overset{O}{\overset{\|}{C}}-$) |
| | | 5.41 M | Anhydride ($-\overset{O}{\overset{\|}{C}}-O-\overset{O}{\overset{\|}{C}}-$) |
| | | 5.80 I | Carboxyl ($-\overset{O}{\overset{\|}{C}}-OH$) |
| | | 5.87 M | Carboxyl ($-\overset{O}{\overset{\|}{C}}-OH$) |

M = maximum; I = inflection; S = shoulder.

The infrared spectra of the untreated yarn did not exhibit any of the characteristic bends cited in Table I for the treated yarn. The characteristic infrared bands cited in Table I for Sample 1, Example 1, demonstrate the presence of both free carboxyl groups and carboxylic ester groups in the treated yarn, as well as the absence of anhydride groups after the water-treatment received by this sample of treated yarn.

EXAMPLE 2

The cellulose fibers used were cotton fibers in the form of 48 x 48 sheeting which had been scoured by the conventional procedures.

Five grams of the scoured cotton sheeting was activated and solvent-exchanged to benzene in the manner described in Example 1. The sample of sheeting was then reacted in a solution consisting of 5 g. of cis-aconitic anhydride, 10 ml. (15.0 g.) of TFAA, and 50 ml. of dry benzene for 24 hours at room temperature (about 26°–28° C.) using the reaction chamber and rotating wheel described in Example 1.

The sample was removed from the reaction chamber and the excess reactants remaining on the sheeting were removed by extracting in a Soxhlet extractor with 10 passes (portions) of dry benzene. The extracted sheeting was stored overnight under vacuum over $P_2O_5$ desiccating agent. The next day the extraction procedure was repeated as before, using petroleum ether (boiling range, 35°–40° C.) and then anhydrous diethyl ether in place of benzene, to further assure that all excess reactants were removed. The sample (No. 1) was stored under vacuum over $P_2O_5$. It was almost indistinguishable from the untreated (control) sheeting, on the basis of hand, feel, color and appearance.

A portion of Sample No. 1 was extracted in a Soxhlet extractor with 10 passes of distilled water. The sample was then allowed to air-dry and equilibrate at room conditions. The equilibrated sample (No. 2) contained 8.7% total aconityl content as determined by a conventional analytical method. This corresponds to 9.8% aconityl anhydride, representing a degree of substitution (D.S.) of 0.13 in Sample No. 1. This D.S. is lower than achieved for yarn and undoubtedly reflects lower accessibility due to fabric construction. Sample No. 2 was essentially comparable to Sample No. 1 in appearance, color, hand and feel.

Infrared absorption spectra of Sample No. 1 (that is, the cellulose ester anhydride) and Sample No. 2 (that is, the cellulose acid ester) were obtained using the conventional procedures. The characteristic infrared bands cited in Table I for Sample 1, Example 2, demonstrate the presence of anhydride groups. No band for anhydride groups and unresolved bands for carboxyl and carboxylic ester groups were obtained for Sample 2, Example 2. This demonstrates that esterification of the cotton had occurred and furthermore that water-treatment opened the cyclic anhydride ring to produce free carboxyl groups.

EXAMPLE 3

The cellulose fibers used were cotton fibers in the form of 12/3 yarn which had been scoured by the conventional procedures. This yarn did not receive any activation treatment nor was it solvent-exchanged to benzene as in the case of the yarn used in Example 1.

10.4 grams of the scoured yarn was reacted in a mixture consisting of 7.5 g. of cis-aconitic anhydride, 15 ml. (22.5 g.) of TFAA, and 130 ml. of dry benzene for 24 hours at room temperature (about 26°–28° C.) using the reaction chamber and rotating wheel described in Example 1.

The sample was removed from the reaction chamber and the excess reactants remaining on the yarn were removed by extracting for 2 hours in a Soxhlet extractor with anhydrous diethyl ether (approximately 18–25 passes). The extracted yarn (Sample No. 1) was stored under vacuum over $P_2O_5$ desiccating agent. It was almost indistinguishable from the untreated (control) yarn, on the basis of appearance, color, hand, and feel. It was insoluble in common solvents such as water, dilute bases, aqueous acids, ethers, hydrocarbons, alcohols, and ketones.

A portion of Sample No. 1 was extracted in a Soxhlet extractor with 10 passes of distilled water. The sample was then allowed to air-dry and equilibrate at room conditions. The equilibrated sample (No. 2) contained 16.3% total aconityl content as determined by the conventional analytical method. This corresponds to 18.4% aconityl anhydride, representing a degree of substitution (D.S.) of 0.26 in Sample No. 1. The maximum cation exchange capacity of Sample No. 2 was 1,992 milliequivalents per kilogram, as determined by the conventional procedure. The sample had a bromine number of 7.2, as determined by the usual bromine absorption analytical procedure, showing a considerable amount of C=C unsaturation was present.

Infrared absorption spectra of Samples 1 and 2 were obtained using the conventional procedures. The characteristic infrared bands cited in Table I for Sample 1, Example 3, demonstrate the presence of anhydride groups and carboxylic ester groups, proving that the product is a cellulose ester anhydride. The anhydride groups are absent in Sample 2, Example 3, which had received a water-treatment to open the anhydride ring structure.

EXAMPLE 4

The cellulose fibers used were cotton fibers in the form of 80 x 80 sheeting which had been scoured by the conventional procedures. This sheeting did not receive any activation treatment nor was it solvent-exchanged to benzene as described in Example 1.

28.6 grams of the scoured cotton sheeting was reacted in a mixture consisting of 40.0 g. of acetyl citric anhydride, 40 ml. (60 g.) of TFAA, and 500 ml. of dry benzene for 23 hours at room temperature (about 26°–28° C.) using the reaction chamber and rotating wheel described in Example 1.

After removal from the reaction chamber, the sheeting was extracted in a Soxhlet extractor for 1.5 hours (about 15 passes) with anhydrous diethyl ether to extract excess reactants. The extracted sheeting (Sample No. 1) was stored under vacuum over sodium hydroxide pellets. It was almost indistinguishable from the untreated (control) sheeting, on the basis of appearance, color, hand and feel.

A portion of Sample No. 1 was extracted twice by immersing in boiling distilled water and boiling about 15 minutes each successive time prior to changing the water. The sample was then removed and allowed to air-dry and equilibrate at room conditions. The equilibrated sample (No. 2) contained 1.5% total acetyl citryl content

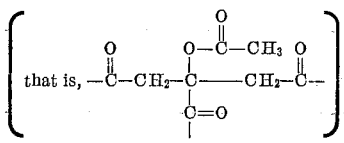

as determined by a conventional analytical method. This corresponds to 1.8% acetyl citryl anhydride

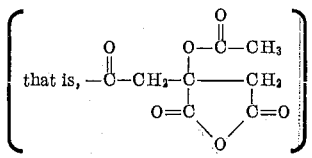

representing a degree of substitution (D.S.) of 0.014 in Sample No. 1. Sample No. 2 was essentially comparable to Sample No. 1 in appearance, color, hand and feel.

Infrared absorption spectra of Samples Nos. 1 and 2 were obtained using the conventional procedures. The characteristic infrared bands cited in Table I for Sample 1, Example 4, demonstrate the presence of anhydride and carboxylic ester groups. No band for anhydride groups and unresolved bands for carboxyl and carboxylic ester groups were obtained for Sample 2, Example 4. This shows that boiling in water opened the cyclic anhydride rings to produce free carboxyl groups.

I claim:

1. A process for producing an ester anhydride of native fiber cellulose comprising subjecting a mixture containing (1) native fiber cellulose having three reactive hydroxyl groups per anhydroglucose unit, (2) a tricarboxylic acid mono-anhydride having one free carboxyl group capable of reacting with the hydroxyl groups of the cellulose to form a cellulose ester linkage and having, in addition, two carboxyl groups linked together in a cyclic anhydride structure, said tricarboxylic acid mono-anhydride being present in the proportion of one mole per mole of said anhydroglucose unit of said native fiber cellulose, and (3) at least one mole of trifluoroacetic anhydride per mole of the tricarboxylic acid mono-anhydride, in an inert non-aqueous solvent in which said tricarboxylic acid mono-anhydride and said trifluoroacetic anhydride are appreciably soluble, to a temperature ranging from about 20° C. up to at least about the reflux temperature of the mixture, to produce an ester anhydride of the cellulose in which the cellulose hydroxyl groups have been esterified by the free carboxyl group of the tricarboxylic acid mono-anhydride, in which the cyclic anhydride structure of the tricarboxylic acid mono-anhydride remains intact and unreacted, which contains about from 0.1 to 0.3 of the tricarboxylic acid mono-anhydride groups per anhydroglucose unit, which possesses latent cation exchange properties, and which retains the native fiber form of the cellulose.

2. The process of claim 1 wherein the tricarboxylic acid mono-anhydride is selected from the group consisting of cis-aconitic anhydride, acetyl citric anhydride, and trimellitic anhydride.

3. The process of claim 1 wherein the tricarboxylic acid mono-anhydride is cis-aconitic anhydride.

4. The process of claim 1 wherein the tricarboxylic acid mono-anhydride is acetyl citric anhydride.

5. The process of claim 1 wherein the native fiber cellulose is cotton fiber, the inert non-aqueous solvent is benzene, and the temperature to which the mixture is subjected is room temperature.

6. A process for producing an ester anhydride of native fiber cellulose comprising soaking native fiber cellulose in water while applying vacuum, solvent-exchanging from water to ethyl alcohol, and solvent exchanging from ethyl alcohol to benzene thereby producing an activated native fiber cellulose having three reactive hydroxyl groups per anhydroglucose unit, forming a mixture containing (1) the activated native fiber cellulose, (2) a tricarboxylic acid mono-anhydride having one free carboxyl group capable of reacting with the hydroxyl groups of the activated cellulose to form a cellulose ester linkage and having, in addition, two carboxyl groups linked together in a cyclic anhydride structure, said tricarboxylic acid mono-anhydride being present in the proportion of one mole per mole of said anhydroglucose unit of the activated native fiber cellulose, and (3) at least one mole of trifluoroacetic anhydride per mole of the tricarboxylic acid mono-anhydride, in an inert non-aqueous solvent in which said tricarboxylic acid mono-anhydride and said trifluoroacetic acid are appreciably soluble, and subjecting this mixture to a temperature ranging from about 20° C. up to at least about the reflux temperature of the mixture to produce an ester anhydride of the cellulose in which the cellulose hydroxyl groups have been esterified by the free carboxyl group of the tricarboxylic acid mono-anhydride, in which the cyclic anhydride structure of the tricarboxylic acid mono-anhydride remains intact and unreacted, which contains about from 0.1 to 0.3 of the tricarboxylic acid mono-anhydride groups per anhydroglucose unit, which possesses latent cation exchange properties, and which retains the native fiber form of the cellulose.

7. The process of claim 6 wherein the tricarboxylic acid mono-anhydride is selected from the group consisting of cis-aconitic anhydride, acetyl citric anhydride, and trimellitic anhydride.

8. The process of claim 6 wherein the tricarboxylic acid mono-anhydride is cis-aconitic anhydride.

9. The process of claim 6 wherein the tricarboxylic acid mono-anhydride is acetyl citric anhydride.

10. The process of claim 6 wherein the native fiber cellulose is cotton fiber, the inert non-aqueous solvent is benzene, and the temperature to which the mixture is subjected is room temperature.

11. The esterification reaction product of native fiber cellulose with a tricarboxylic acid mono-anhydride having one free carboxyl group capable of reacting with the hydroxyl groups of the cellulose to form a cellulose ester linkage and having, in addition, two carboxyl groups linked together in a cyclic anhydride structure, said esterification product being an ester anhydride of cellulose in which the cellulose hydroxyl groups have been esterified by the free carboxyl group of the tricarboxylic acid mono-anhydride, in which the cyclic anhydride structure of the tricarboxylic acid mono-anhydride remains intact and unreacted, which contains about from 0.1 to 2.3 of the tricarboxylic acid mono-anhydride groups per anhydroglucose unit, which possesses latent cation exchange properties, and which retains the native fiber form of the cellulose.

12. The esterification reaction product of claim 11 wherein the tricarboxylic acid mono-anhydride is selected from the group consisting of cis-aconitic anhydride, acetyl citric anhydride, and trimellitic anhydride.

13. The esterification reaction product of claim 11 wherein the tricarboxylic acid mono-anhydride is cis-aconitic anhydride.

14. The esterification reaction product of claim 11 wherein the tricarboxylic acid mono-anhydride is acetyl citric anhydride.

References Cited in the file of this patent

UNITED STATES PATENTS

| | | |
|---|---|---|
| 2,093,462 | Malm | Sept. 21, 1937 |
| 2,093,463 | Malm | Sept. 21, 1937 |
| 2,172,475 | Kaase | Sept. 12, 1939 |
| 2,225,589 | Haussmann | Dec. 17, 1940 |
| 2,372,386 | Moncrieff | Mar. 27, 1945 |
| 2,622,080 | Richter | Dec. 16, 1952 |

OTHER REFERENCES

Ott et al.: High Polymers, vol. V, 2nd edition, Cellulose, 1954, Part I, pp. 158–161.

Textile Research Journal, February 1957, p. 168.